United States Patent [19]

Miyawaki

[11] Patent Number: 4,843,913
[45] Date of Patent: Jul. 4, 1989

[54] TRANSMISSION RATIO CONTROL SYSTEM FOR A CONTINUOUSLY VARIABLE TRANSMISSION

[75] Inventor: Motohisa Miyawaki, Chofu, Japan

[73] Assignee: Fuji Jukogyo Kabushiki Kaisha, Tokyo, Japan

[21] Appl. No.: 86,103

[22] Filed: Aug. 14, 1987

[30] Foreign Application Priority Data

Aug. 20, 1986 [JP] Japan .................. 61-196240

[51] Int. Cl.⁴ ............................................. F16H 41/14
[52] U.S. Cl. ........................................ 74/844; 74/866
[58] Field of Search .................. 74/844, 856, 861, 866

[56] References Cited

U.S. PATENT DOCUMENTS

| 4,565,110 | 1/1986 | Ito ........................................ 74/867 |
| 4,566,354 | 1/1986 | Kumura et al. ....................... 74/866 |
| 4,663,991 | 5/1987 | Nakamura et al. ................... 74/866 |
| 4,713,987 | 12/1987 | Matsumura ........................... 74/866 |
| 4,736,301 | 4/1988 | Osanai .................................. 74/866 |

FOREIGN PATENT DOCUMENTS 0081561  5/1985  Japan ..................................... 74/844

*Primary Examiner*—Leslie A. Braun
*Assistant Examiner*—Harold F. Macris
*Attorney, Agent, or Firm*—Martin A. Farber

[57] ABSTRACT

A control system for a continuously variable transmission for a motor vehicle has a transmission ratio control valve having a spool for controlling oil supplied to a cylinder of a drive pulley to change the transmission ratio. The transmission ratio control valve has chambers at both ends of the spool. By controlling flow rate of oil supplied to the chambers in accordance with a desired transmission ratio, the spool is shifted, so that the transmission ratio changing rate is controlled. The transmission ratio changing rate is reduced at cold engine so as to prevent decrease of the vehicle speed at acceleration.

9 Claims, 5 Drawing Sheets

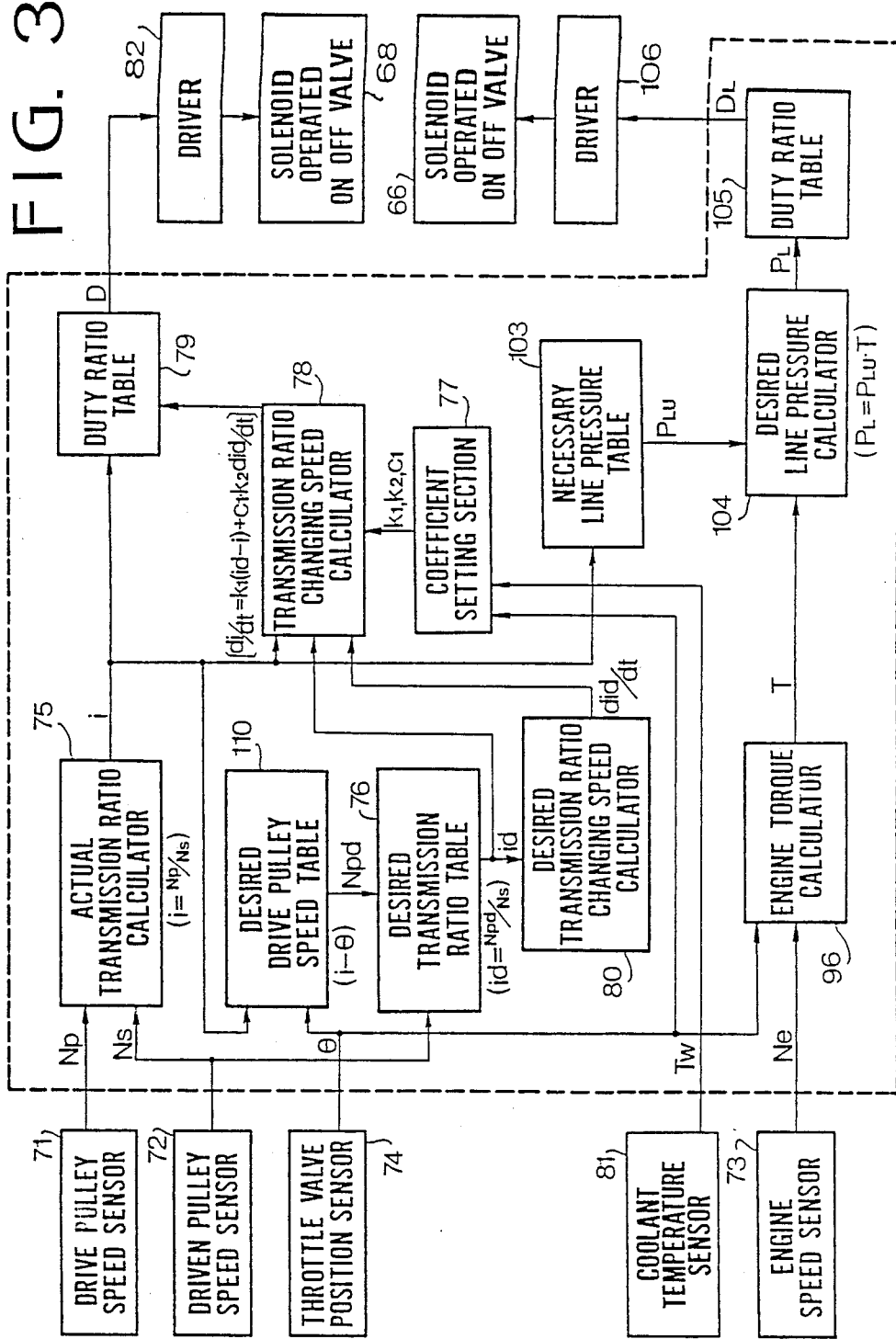

TRANSMISSION RATIO CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling transmission ratio changing speed (rate) at cold engine.

A known control system for a continuously variable belt-drive transmission comprises an endless belt running over a drive pulley and a driven pulley. Each pulley comprises a movable conical disc which is axially moved by a fluid operated servo device so as to vary the running diameter of the belt on the pulleys in depending on driving conditions. The system is provided with a hydraulic circuit including a pump for supplying oil to the servo devices, a line pressure control valve and a transmission ratio control valve. Each valve comprises a spool to control the oil supplied to the servo devices.

The transmission ratio control valve operates to decide the transmission ratio in accordance with the opening degree of a throttle valve of an engine and the speed of the engine. The line pressure control valve is adapted to control the line pressure in accordance with the transmission ratio and the engine speed. The line pressure is controlled to prevent the belt from slipping on pulleys in order to transmit the output of the engine.

At the start of the vehicle, the transmission ratio is set at a maximum value. When the vehicle speed and engine speed reach set values under a driving condition, the transmission ratio starts to change (to upshift). The transmission ratio is automatically and continuously reduced at a speed (rate) which is decided by line pressure, pressure of oil supplied to the servo device of the drive pulley, and actual transmission ratio. In such a system, the speed (rate) of changing of desired transmission ratio (id) is controlled in accordance with driving conditions to eliminate control delay due to the slow response of the transmission control system. In other words, the desired transmission ratio changing speed (rate) did/dt is obtained from a desired drive pulley speed $N_p d$ dependent on load on engine and actual transmission ratio i, desired transmission ratio id dependent on driven pulley speed $N_S$, and the difference between the actual transmission ratio i and the desired transmission ratio id. Thus, in order to compensate for the control delay, transmission ratio changing speed (rate) di/dt is calculated as follows.

$$di/dt = K1(id - i) + K2 \cdot did/dt.$$

where K1 and K2 are coefficients.

However, the coefficients K1 and K2 are set so as to meet requirements for driving the vehicle when the engine is sufficiently warmed up. Accordingly the coefficients are not appropriate for cold engine, where engine speed does not correspond to an opening degree of a throttle valve. For example, the transmission ratio control system is adapted to downshift the transmission when the vehicle speed does not increase in spite of the increase in the opening degree of the throttle valve. Accordingly, at cold engine when engine speed does not increase even if an accelerator pedal is quickly depressed, the transmission is downshifted, resulting in a decrease of the vehicle speed although acceleration of the vehicle is intended.

SUMMARY OF THE INVENTION

The object of the present invention is to provide a system wherein changing speed of desired transmission ratio is reduced at cold engine so that the vehicle can be smoothly driven.

The other objects and features of this invention will become understood from the following description with reference to the accompanying drawings.

BRIEF DESCRIPTION OF DRAWINGS

FIG. 3 is a block diagram showing a control unit;

DETAILED DESCRIPTION OF THE PREFERRED EMBODIMENT

Figure 1:
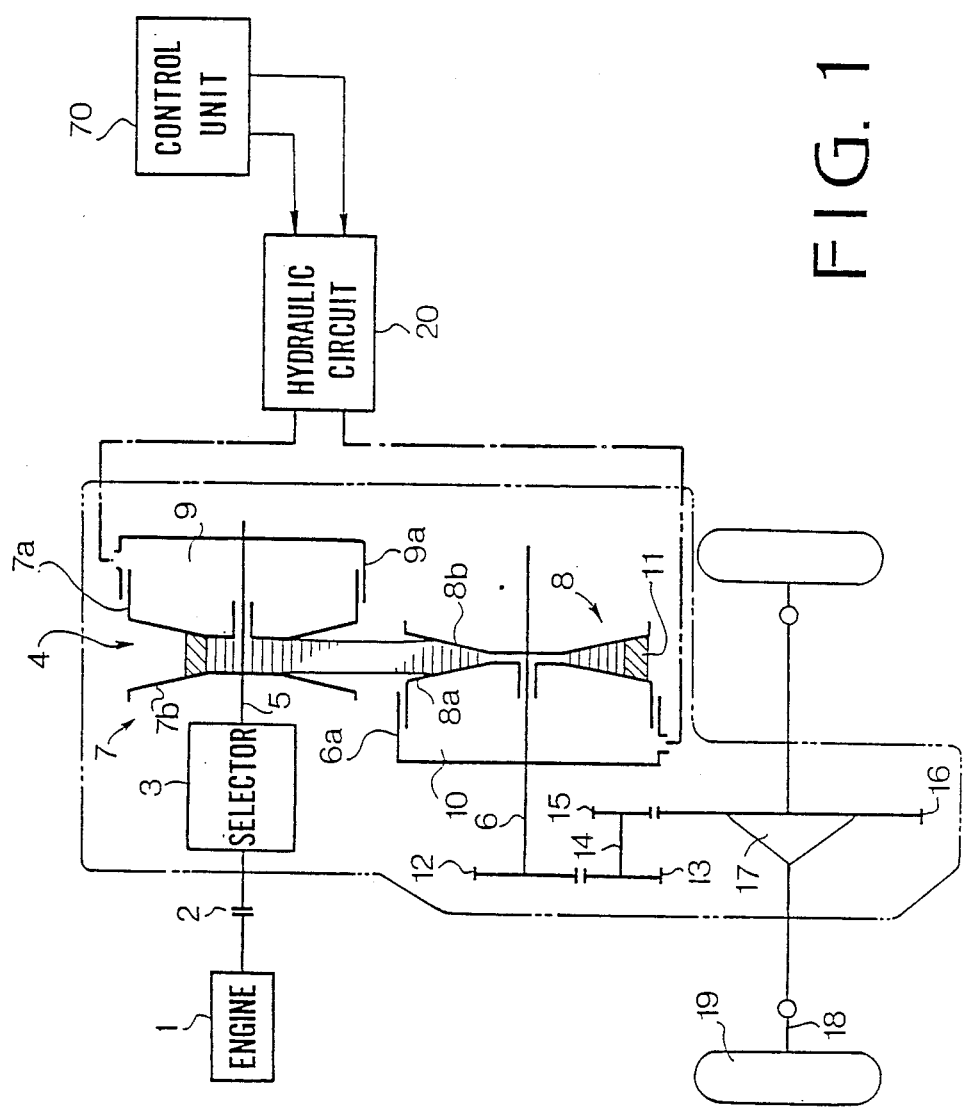
FIG. 1 is a schematic illustration of a continuously variable belt-drive transmission.

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on shafts 5 and 6 respectively. A fixed conical disc 7b of the drive pulley 7 is integral with main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final 10. gear 16 is transmitted to axles 18 of vehicle driving wheels 19 through a differential 17.

Figure 2A:
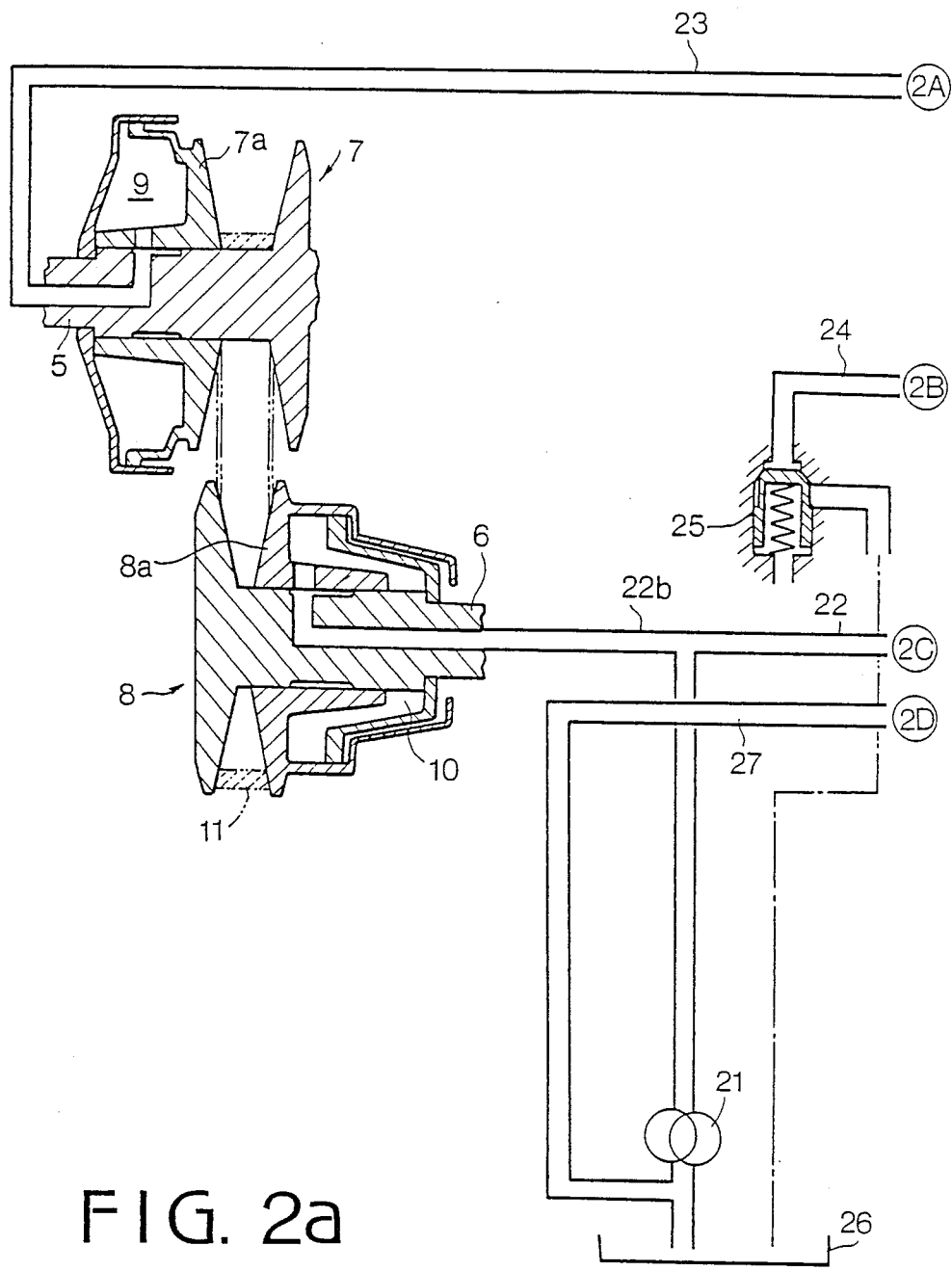
FIGS. 2a and 2b are schematic diagrams showing a control system according to the present invention.
Figure 2B:
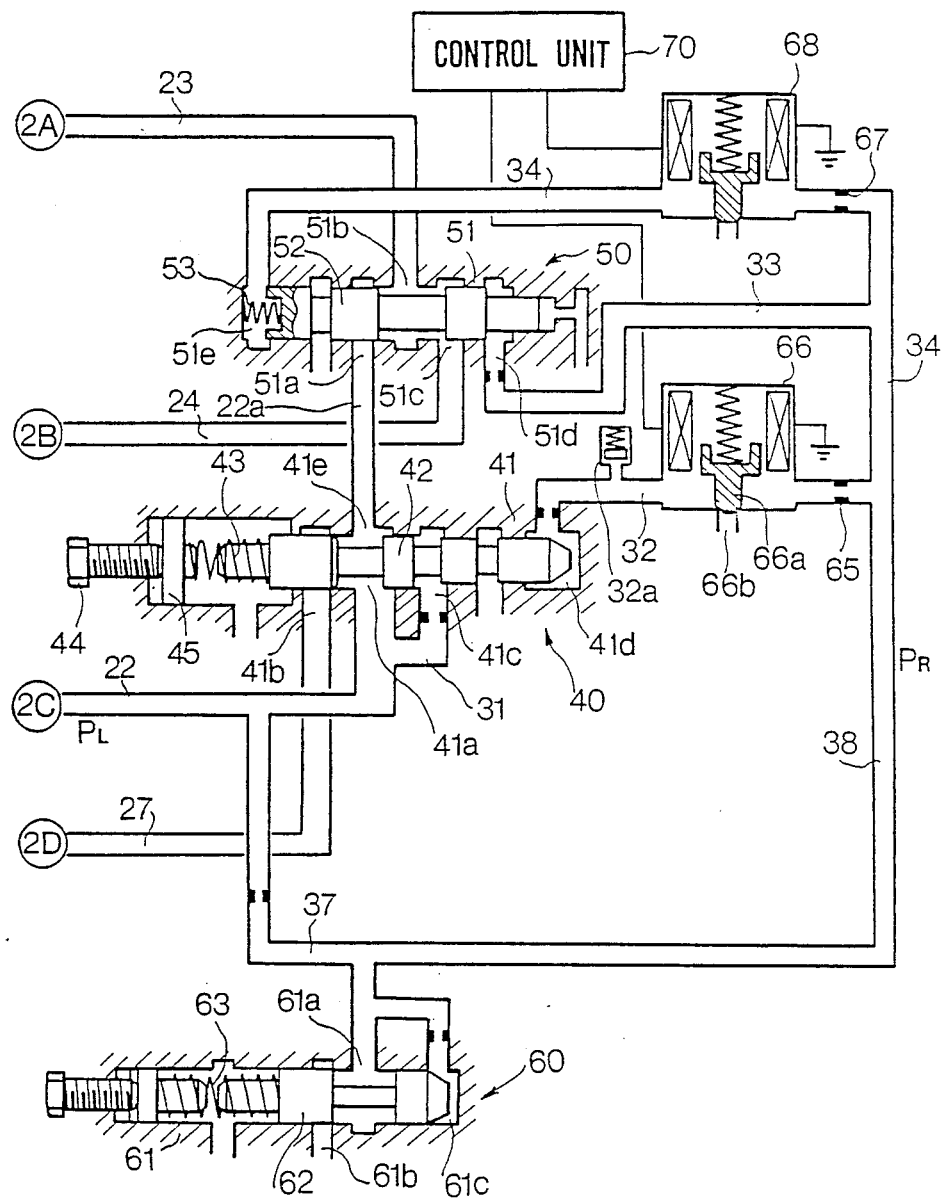

Referring to FIGS. 2a and 2b, chamber 9 of the drive pulley 7 is supplied with pressurized oil by an oil pump 21 from an oil reservoir 26 passing through a line pressure conduit 22, ports 41a and 41e of a line pressure control valve 40, transmission ratio control valve 50, and conduit 23. The chamber 10 of driven pulley 8 is applied with pressurized oil through a passage 22b without passing through valves 40 and 50. The movable conical disc 7a of the drive pulley 7 is so designed that the pressure receiving area thereof is larger than that of movable conical disc 8a of the driven pulley 8. The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the force of a spring 43 provided between the end of the spool 42 and a retainer 45 the position of which is adjustable by a screw 44. The port 41a is communicated with a drain port 41b for a drain passage 27 in accordance with the position of a land of the spool 42. The drain port 41b communicates with oil reservoir 26 through passage 27.

The transmission ratio control valve 50 comprises a valve body 51, spool 52, and a spring 53 for urging the spool 52 in the downshift direction. A port 51b of the valve body 51 is selectively communicated with a pressure oil supply port 51a or a drain port 51c in accordance with the position of lands of spool 52. Port 51b communicates with chamber 9 through conduit 23, and port 51a communicates with port 41e of line pressure control valve 40 through conduit 22a. The drain port 51c is communicated with the oil reservoir 26 through a conduit 24 and a check valve 25.

The system is provided with a regulator valve 60, and solenoid operated on-off valves 66 and 68.

The regulator valve 60 comprises a valve body 61, an inlet port 61a connected to the pump 21 through passages 37 and 22, a spool 62, an end chamber 61c connected to the passage 37, and a spring 63 urging the spool 62 to the chamber 61c. When the pressure of oil in the chamber 61c becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid operated on-off valve 66, and passage 32 having an accumulator 32a. Further, the passage 38 is communicated with an end chamber 51d of the transmission ratio control valve 50 through a passage 33, and with another end chamber 51e through an orifice 67, solenoid operated on-off valve 68 and passage 34. The solenoid operated on-off valve 66 is adapted to be operated by pulses. When energized, a valve 66a opens a drain port 66b. The pulsation of the pressure of oil in the passage 32 is smoothed by accumulator 32a. The solenoid operated on-off valve 68 is the same as valve 66 in construction and operation. The valves 66 and 68 are operated by signals from a control unit 70. Thus, pressure controlled by the valves 66 and 68 is applied to chambers 41d and 51e.

In the transmission ratio control valve 50, pressure receiving area of the spool 52 at chamber 51e is set to a value larger than the area at the chamber 51d. On the other hand, the control pressure in the chamber 51e can be changed between a maximum value, which is the same as the constant pressure in the chamber 51d, when the duty ratio is 0% and zero by controlling the duty ratio of pulses for operating the valve 68. The transmission ratio control valve 50 is so arranged that the spool 52 is at a neutral position at a middle duty ratio (for example 50%) and is located in an oil supply position by increasing the duty ratio from the middle duty ratio because of reduction of control pressure in the chamber 51e. Further, the speed of the movement of the spool 52 changes with the magnitude of changing of the duty ratio. The spool 52 is shifted to an oil drain position by decreasing the duty ratio. It will be understood that when the oil is supplied to the chamber 9, the transmission is upshifted.

The relationship between the duty ratio of pulses applied to the solenoid operated control valve 68 and the transmission ratio is explained hereinafter.

Necessary volume V of oil in the chamber 9 is a function of transmission ratio i, namely:

$$V = f(i)$$

Flow rate Q is obtained by differentiating the volume V with time and expressed as $$Q = dV/dt = df(i)/di \cdot di/dt$$
$$di/dt = f(Q, i)$$

Supply flow rate $Q_s$ and drain flow rate $Q_d$ are presented as $$Q_d = C \cdot S_d \sqrt{2g\, P_p/\gamma} = a \cdot S_d \sqrt{P_p}$$
$$Q_s = a \cdot S_s \sqrt{P1 - P_p}$$
$$a = c\sqrt{2g/\gamma}$$

where
 is the pressure in chamber 9,
P1 is the line pressure,
C is the coefficient for flow rate,
g is the acceleration of gravity,
γ is the specific gravity of oil,
$S_s$ is the opening ara of supply port 51a,
$S_d$ is the opening area of drain port 51c.

Designating by D the duty ratio of pulses applied to the control valve, that is the ratio of ON/OFF of the valve, average flow rate Q in one cycle (oil supply state is positive) is $$Q = a(D \cdot S_s \sqrt{P1 - P_p} - (1-D) \cdot S_d \sqrt{P_p})$$

Assuming a, $S_s$ and $S_d$ to be constants, $$Q = f(D, P1, P_p)$$

The line pressure P1 is decided by the transmission ratio i and engine torque, and the pressure $P_p$ in the chamber 9 is decided by the transmission ratio i and the line pressure P1. Accordingly, assuming the engine torque to be constant, $$Q = f(D, i)$$

Since $di/dt = f(Q, i)$ $$di/dt = f(D, i)$$

$$D = f(di/dt, i)$$

Accordingly, the duty ratio is decided by the transmission ratio changing speed (rate) di/dt and the transmission ratio i. In a feedback control system, the transmission ratio changing speed (rate) di/dt can be determined by the difference between the actual transmission ratio i and a desired transmission ratio id, as follows.

$$di/dt = K1\,(id - i)$$

where K1 is a coefficient.

Further, if the transmission ratio changing speed (rate) di/dt is decided, the duty ratio D can be obtained from the speed (rate). When the actual transmission ratio i is larger than the desired transmission ratio id (i>id), the value of di/dt is negative. In such a state, the duty ratio D is increased to reduce the pressure in the chamber 51e so as to upshift the transmission. The downshifting is performed in the reverse manner.

However, the response of the transmission control system including various mechanisms is slow, which means that the convergence of the actual transmission ratio to the desired transmission ratio delays.

In order to eliminate the control delay, the transmission ratio changing speed (rate) di/dt is corrected by the speed (rate) of change of the desired transmission ratio (did/dt), as follows.

$$di/dt = K1(id-i) + C1.K2.did/dt$$

where K2 and C1 are coefficients.

The desired transmission ratio changing speed (rate) did/dt is to advance the phase of the control operation. Thus, the response of the system can be improved. The speed (rate) did/dt is obtained by the amount ($\Delta$id) of change of the desired transmission ratio at predetermined intervals ($\Delta$t), that is $\Delta$id/$\Delta$t.

The coefficient K1 is set in accordance with the opening degree of the throttle valve, and the coefficient K2 in accordance with physical conditions of the system. In the system of the invention, coefficient K2 is set to a value so as to correspond to response delay of the engine power generation at cold engine. The coefficient C1 varies in accordance with the change in the coolant temperature. The coefficient C1 is 1 (C1=1) when the coolant temperature is higher than a predetermined value and smaller than 1 (C1<1) when the coolant temperature is lower than the value.

Referring to FIG. 3, the system is arranged to control the transmission ratio in accordance with the above described principle. In the system, a drive pulley speed sensor 71, driven pulley speed sensor 72, engine speed sensor 73, throttle position sensor (or intake manifold pressure sensor) 74 and coolant temperature sensor 81 are provided. Output signals $N_p$ and $N_S$ of sensors 71, 72 are fed to an actual transmission ratio calculator 75 to produce an actual transmission ratio i in accordance with i=$N_P$/$N_S$. The actual transmission ratio i and output signal $\theta$ representing the opening degree of the throttle position sensor 74 are fed to a desired drive pulley speed table 110 shown in FIG. 4b. A desired speed $N_Pd$ in the table 110 and the driven pulley speed $N_S$ are fed to a desired transmission ratio table 76 where calculation of id=$N_Pd$/$N_S$ is made.

Figure 4A:
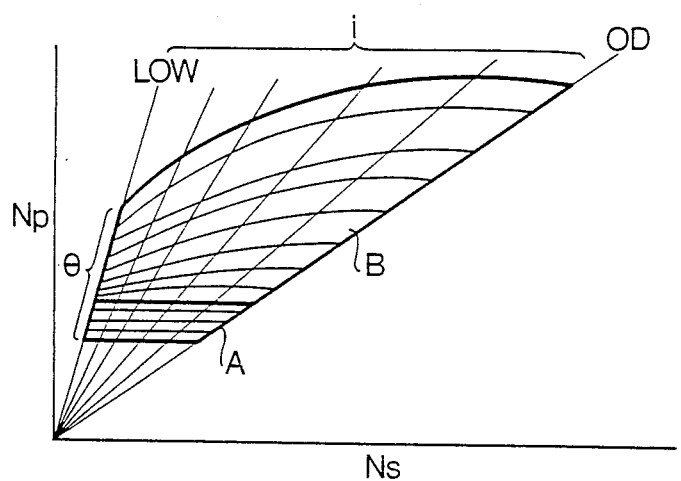
FIG. 4a is a graph showing a relationship between drive and driven pulley speeds.
Figure 4B:
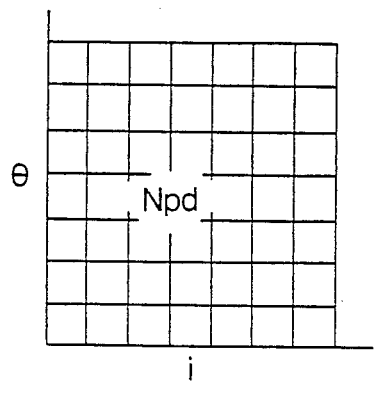
FIG. 4b is a look-up table for desired pulley speed.

Referring to FIG. 4a, in a range A where the opening degree $\theta$ of the throttle valve is small, the driven pulley speed $N_S$ (vehicle speed) increases even though the drive pulley speed $N_P$ (engine speed) is kept constant. This means that the transmission ratio is continuously changed. In a range B where the opening degree is larger, the transmission is upshifted by increasing drive pulley speed $N_P$ (engine speed). The table 110 (FIG. 4b) is in accordance with such a transmission characteristic pattern.

The desired transmission ratio id is fed to a desired transmission ratio changing speed calculator 80 which produces a desired transmission ratio changing speed (rate) did/dt. A coefficient setting section 77 produces coefficients K1 and K2 and C1 in accordance with the signal $\theta$ and an output signal TW of the coolant temperature sensor 81. The actual transmission ratio i, desired transmission ratio id, desired transmission ratio changing speed (rate) did/dt and coefficients K1, K2 and C1 are applied to a transmission ratio changing speed calculator 78 to produce a transmission ratio changing speed (rate) di/dt from the formula $di/dt = K1(id-i) + C1.K2.did/dt$.

Figure 4C:
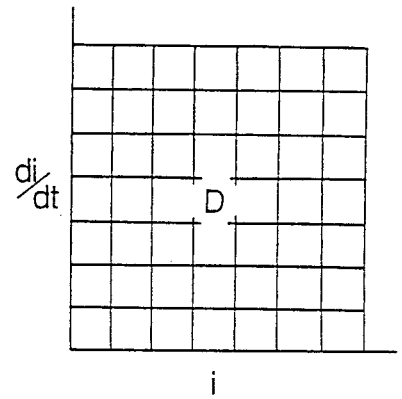
FIG. 4c is a look-up table for duty ratio.

The speed (rate) di/dt and actual transmission ratio i are applied to a duty ratio table 79 to derive the duty ratio D. The table 79 is shown in FIG. 4c. The duty ratio D is supplied to the solenoid operated on-off valve 68 through a driver 82.

Further, the output signal $\theta$ of throttle position sensor 74 and the output $N_e$ of engine speed sensor 73 are fed to an engine torque calculator 96, so that engine torque T is calculated based on throttle position $\theta$ and engine speed $N_e$.

On the other hand, the actual transmission ratio i from the calculator 75 is applied to a necessary line pressure table 103 to derive a necessary line pressure $P_{LU}$ per unit torque. The necessary line pressure $P_{LU}$ and the engine torque T are applied to a desired line pressure calculator 104 where a desired line pressure $P_L$ is calculated.

The desired line pressure $P_L$ is applied to a duty ratio table 105 to derive a duty ratio $D_L$ corresponding to the desired line pressure $P_L$. The duty ratio $D_L$ is supplied to a driver 106 which operates the solenoid operated on-off valve 66 at the duty ratio.

In operation, while the vehicle is at a stop, chamber 10 of the driven pulley 8 is supplied with line pressure through passage 22b, and the chamber 9 of the drive pulley 7 is drained, since $N_P$, $N_s$, $\theta$ and duty ratio D are zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the clutch current increases progressively with increase of engine speed. The electromagnetic clutch 2 is gradually engaged, transmitting the engine power to the drive pulley 7. The power of the engine is transmitted to the output shaft 6 at the largest transmission ratio by the driving belt 11 and driven pulley 8, and further transmitted to axles of the driving wheels 19. Thus, the vehicle is started. When the vehicle speed (output signal $N_s$) exceeds a predetermined value, the clutch 2 is entirely engaged.

At the start of the vehicle, the line pressure is at the highest value by the pressure control valve 40, since the duty ratio for the valve 66 is large, and the spool 42 of the control valve 40 is at the right end position. When the throttle valve is opened for acceleration of the vehicle, the desired transmission ratio changing speed (rate) did/dt and transmission ratio changing speed (rate) di/dt are calculated at calculators 80 and 78. The transmission ratio changing speed (rate) di/dt is fed to the duty ratio table 79, so that duty ratio D for valve 68 is obtained from the table 79. When the depression of the accelerator pedal stops, the transmission ratio changing speed (rate) di/dt becomes negative. Accordingly the value of the duty ratio D becomes larger than the neutral value, so that the pressure in the chamber 51d of the control valve 50 is higher than the chamber 51e. Thus, the spool 52 is shifted to the left to communicate the port 51a with port 51b, so that oil is supplied to the chamber 9 through the conduit 23 to upshift the transmission. When the actual transmission ratio i reaches the desired transmission ratio id, the changing speed (rate) di/dt becomes zero, so that the upshifting operation stops.

As the difference between the desired ratio id and actual ratio i becomes large and the desired transmission ratio changing speed (rate) becomes large, the duty ratio for the valve 68 becomes large, thereby increasing the shifting speed of the spool 52 to increase the actual transmission changing speed (rate). When the opening degree of the throttle valve is reduced for deceleration, the duty ratio is reduced along a low engine speed line, thereby shifting the spool 52 to the right to drain the chamber 9. Thus, the transmission is downshifted. The transmission (rate) changing speed (rate) at downshifting increases with reducing of the duty ratio.

During operation at cold engine, when the output $T_W$ indicates that the coolant temperature is below a predetermined value, the coefficient C1 is smaller than 1. Accordingly, the transmission ratio changing speed (rate) di/dt is reduced to a lower value than when the engine is warmed up. Thus, the control of transmission ratio changing speed (rate) delays until the coolant temperature $T_W$ reaches the predetermined value.

The control operation of line pressure will be described hereinafter. From the engine torque calculator 96, a torque T is obtained in accordance with throttle position $\theta$ and engine speed $N_e$, which is applied to desired line pressure calculator 104. The calculator calculates a desired line pressure $P_L$. The solenoid operated on-off valve 66 is operated at a duty ratio corresponding to the desired line pressure $P_L$. The line pressure is applied to chamber 10 to hold the belt 11 at a necessary minimum force, the transmitting torque at which is slightly larger than torque T. Thus, power is transmitted through the transmission without slipping of the belt.

From the foregoing it will be understood that the present invention provides a transmission ratio control system wherein the transmission ratio changing speed (rate) depending on engine speed is reduced at cold engine so as to provide a smooth transmission ratio control.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a control system for a continuously variable transmission for transmitting power of an engine, the transmission comprising a drive pulley having a hydraulically shiftable first disc and a first hydraulic cylinder for operating the disc, a driven pulley having a hydraulically shiftable second disc and a second hydraulic cylinder for operating the second disc, and a belt engaged with both pulleys, the control system including a first hydraulic circuit having a pump for supplying oil to both of said hydraulic cylinders, a transmission ratio control valve having a spool for controlling the oil supplied to the first hydraulic cylinder to change the transmission ratio of the transmission to a desired transmission ratio, shifting means for shifting the spool, sensing means for sensing operating conditions of the engine and the transmission and for producing signals dependent on the conditions, coolant temperature sensing means for sensing coolant temperature of the engine and for producing a temperature signal dependent on the coolant temperature, first means responsive to the condition signals for producing a desired transmission ratio signal and an actual transmisssion ratio signal, transmission ratio changing speed calculating means responsive to a difference value between the desired transmission ratio signal and the actual transmission ratio signal for producing an actual transmission ratio changing rate signal, and driving means responsive to the actual transmission ratio changing rate signal and the actual transmission ratio signal for operating the shifting means, the improvement in the system comprising desired transmission ratio changing speed calculating means responsive to the desired transmission ratio signal for producing a desired transmission ratio changing rate signal, coefficient setting means responsive to the temperature signal for setting a coefficient signal providing a smaller value than a basic value when a value of the temperature signal is lower than a predetermined value, said coefficient signal adapted for correcting the desired transmission ratio changing rate, and said transmission ratio changing speed calculating means being further responsive to the desired transmission ratio changing rate signal and the coefficient signal for correcting the desired transmission ratio changing rate so that the transmission ratio changing speed calculating means corrects the actual transmission ratio changing rate signal so as via said driving means and shifting means to advance a phase of the control operation so as to correspond to response delay of engine power generation at cold engine and warmed up engine.

2. The control system according to claim 1 wherein the transmission ratio control valve has chambers at both ends of the spool, the shifting means includes a second hydraulic circuit for supplying oil to the chambers, and control valve means provided in the second hydraulic circuit for controlling flow rate of control oil supplied to at least one of the chambers of the transmission ratio control valve.

3. The control system according to claim 2 wherein the control valve means is a solenoid operated on-off valve, and control signal of the driving means is pulses the duty ratio of which is changed so as to control transmission ratio changing (rate) speed.

4. The control system according to claim 2 wherein the second hydraulic circuit is provided with a regulator valve for maintaining the pressure of oil in the second hydraulic circuit at a constant value 5. The control system according to claim 1 wherein the sensing means comprises a drive pulley speed sensor, driven pulley speed sensor and throttle valve position sensor.

6. The control system according to claim 1, wherein said coefficient setting means sets said coefficient signal as a varying value in dependency on the coolant temperature.

7. The control system according to claim 1, wherein said coeffiecient setting means sets said coefficient signal as 1 as said basic value when the value of said temperature signal is above said predetermined value and less than 1 when the value of said temperature signal is under said predetermined value.

8. The control system according to calim 1, wherein said transmission ratio changing speed calculating means multiplies said coefficient signal and said desired transmission ratio changing rate signal to form a product which is added to the difference value between the desired transmission ratio signal and the actual transmission ratio signal so as to produce the corrected actual transmission ratio changing rate signal.

9. The control system according to claim 1, wherein said coefficient setting means being further responsive to physical conditions of the system to produce another coefficient signal set to a value so as to correspond to the response delay of the engine power generation at a cold engine, said transmission ratio changing speed calculating means being further responsive to the desired transmission ratio changing rate signal and both of said coeifficient signals for correcting the desired transmission ratio changing rate.

* * * * *